United States Patent Office 2,835,657
Patented May 20, 1958

2,835,657

ELASTIC GASOLINE-RESISTANT COPOLYMERS

Hans Fikentscher, Ludwigshafen (Rhine), Hans Peter Siebel, Ludwigshafen (Rhine), Oppau, and Walter Daniel and Fritz Rieder, Ludwigshafen (Rhine), Germany, assignors to Badische Anilin- & Soda-Fabrik Aktiengesellschaft, Ludwigshafen (Rhine), Germany No Drawing. Application July 26, 1955
Serial No. 524,586

Claims priority, application Germany August 3, 1954

10 Claims. (Cl. 260—80.5)

This invention relates to elastic gasoline-resistant copolymers and to a method of manufacturing such copolymers. More specifically, the invention deals with elastic copolymers of acrylonitrile, vinyl methyl ether, and an acrylic acid ester which may also contain optionally a diolefinic compound as an additional comonomer.

Copolymers of at least 55% acrylonitrile and vinyl ethers which also may contain acrylic acid esters have been described. These prior art copolymers, however, are solid, hard and non-elastic-materials from which fibrous and film-like articles are made.

It is an object of this invention to provide new elastic copolymers of acrylonitrile, vinyl methyl ether and an acrylic acid ester which are resistant to gasoline or other petroleum hydrocarbons.

Another object is to provide a method of manufacturing such copolymers.

Further objects are to provide a copolymer of acrylonitrile, vinyl methyl ether, an acrylic acid ester and a diolefinic compound and a method of making such copolymers.

Other objects and advantages will be apparent from the more detailed description of the invention.

These objects are accomplished according to the invention by copolymerizing a mixture of from 3 to 40% of acrylonitrile, 10 to 52% of vinyl methyl ether and 87 to 8% of an acrylic acid ester of a saturated aliphatic monohydric alcohol containing from 2 to 4 carbon atoms in its molecule. The preferred percentages of the monomers are: 3–25% of acrylonitrile; 15–40% of vinyl-methyl ether and 82–35% of acrylic acid ester. The copolymers are elastic, rubber-like products with a good aging resistance and are insoluble and substantially do not swell in petroleum hydrocarbons.

Suitable acrylic acid esters are, for example, the ethanol, 1-propanol, 2-propanol, 1-butanol, 2-butanol, or the 1-methyl-2-propanol esters. The polymerization is carried out in the usual manner, such as by emulsion, mass, solution or bead polymerization, preferably in aqueous emulsion and or in the presence of an indifferent gas. As an emulsifier, a well known emulsifying agent such as alpha-hydroxy-octodecane sodium sulfonate or the saponification products of long chain sulfohalogenated aliphatic hydrocarbons or aryl sulfonates may be used.

The polymerization may be initiated by heating the monomer mixture but preferably polymerization catalysts are added to accelerate the polymerization reaction. Suitable catalysts are radical-forming catalysts such as peroxy or azo compounds, for instance, azo-iso-butyronitrile. For the polymerization in aqueous emulsion, water soluble catalysts such as persulfates, for instance, potassium, sodium or ammonium persulfate, are used with advantage. The pH of the aqueous emulsion is usually kept in the slight alkaline range, preferably between pH 7 and pH 9. Such a pH can be adjusted by the addition of well known buffer substances such as sodium pyrophosphate or ammonium bicarbonate. Inorganic or organic reducing agents such as triethanolamine or rongalite may also be added to the aqueous emulsion in order to activate the polymerization reaction. In the presence of these activators, the polymerization may be performed at lower temperatures. As a rule, the polymerization temperature lies between 20 and 100° C., preferably between 40 and 70° C.

The polymerization is preferably carried out in a closed pressure-resistant vessel on account of the volatility of the vinyl methyl ether. Advantageously, the vinyl methyl ether is placed initially in the polymerization vessel and the other monomers are introduced during the polymerization. If the monomers are copolymerized in aqueous emulsion the copolymers may be separated from the resultant polymer dispersion by the addition of the known precipitating agents, such as acids, sodium chloride or aluminum sulfate. It is, however, also possible to remove the water from the dispersions by evaporating or freezing. The polymers may be washed, for instance, on a ribbed cylinder before they are dried to eliminate impurities such as emulsifiers, catalysts or buffers. The resultant polymers have the same percentage constitution as the charge of monomer mixture. The K-values of the polymers range between 40 and 120.

The copolymers of this invention may be used in the manufacture of different articles with conventional machines such as cylinders, kneaders, screw-extenders and extrusion presses. They may be mixed with fillers such as talcum, siliceous chalk, carbon black, alumina gel or ground shale. By the addition of fillers the mechanical properties of the copolymers are often improved. The copolymers are in particular suitable as raw materials for manufacturing foils which may be used as a lining material for vessels and tubes or as floor coverings.

Copolymers which possess the already described valuable properties and which are additionally vulcanizable are obtained when mixtures of from 3 to 40% of acrylonitrile, 9 to 47% of vinyl methyl ether, 87 to 8% of an acrylic acid ester of a saturated aliphatic monohydric alcohol and from 1 to 5% of a diolefinic compound are copolymerized. As diolefinic compounds, preferably aliphatic hydrocarbons containing two conjugated double bonds and their chloro derivatives such as 1,3-butadiene, isoprene and 2-chloro-1,3-butadiene are used. These copolymers can be vulcanized in the usual manner. Tetramethylthiuram disulfide, mercaptobenzthiazol, diphenylguanidine, diphenyl thiourea, hexamethylene tetramine and sulfur may be used as vulcanizing agents. Antioxidants such as phenyl-beta-naphthylamine or di-(para-tert.-butyl-phenyl)-sulfide can be added to the copolymers to improve their age resistance.

The vulcanizable copolymers may be processed with or without the addition of fillers or plasticizers. They are vulcanized after they have been shaped and yield vulcanized products which are insoluble in petroleum hydrocarbons. These products may be used in the form of foils or as sealing materials in all the fields where gasoline-resistant materials are of interest.

The invention will be further illustrated but not limited

EXAMPLE I 10 parts of water, 0.5 part of alkyl ($C_{14}$–$C_{18}$) sodium sulfonate and 0.025 part of rongalite are introduced in an enameled pressure-tight vessel provided with a stirrer. The air in the vessel is replaced by nitrogen and 3.37 parts of vinyl methyl ether are introduced under pressure. After heating the contents of the vessel to a temperature of 55° C. a mixture of 2.31 parts of acrylic acid ethyl ester and 1.84 parts of acrylonitrile and an aqueous solution of 0.075 part sodium persulfate and 0.13 part sodium pyrophosphate are introduced under pressure within three hours. The end of the reaction is indicated by the decline of the pressure in the reaction vessel.

The resultant polymer dispersion is coagulated by the addition of a solution of 1.5 parts of sodium chloride in 10 parts of water. The coagulated polymer is washed with water on a ribbed cylinder to remove the emulsifying agent. The polymer is then dried and 0.02 part of di-(para-tert.-butyl-phenyl)-sulfide are worked into the polymer. From mixtures of this polymer with different fillers in the ratio of 1:2 foils with the following characteristics may be processed:

| Filler | Tensile Strength, kg./cm.² | Elongation, percent | Gasoline Absorption, percent |
| --- | --- | --- | --- |
| Ground Shale | 85 | 100 | 0.4 |
| Siliceous Chalk | 150 | 30 | 0.2 |
| Kaolin | 220 | 50 | 0.2 |
| Alumina Gel | 290 | 40 | 0.5 |

The gasoline absorption has been determined by placing 1 mm. thick samples of the foil for 4 days at a temperature of 25° C. in a gasoline having a boiling point range of between 50° and 120° C.

EXAMPLE II 10 parts of water, 0.25 part of alkyl ($C_{14}$–$C_{18}$) sodium sulfonate and 0.025 part of triethanolamine are introduced in an enameled pressure vessel provided with a stirrer. 3.12 parts of vinyl methyl ether are pressed in after the air of the vessel has been replaced by nitrogen. The content of the vessel is heated to a temperature of 60° C. Within 3 hours a mixture of 3.23 parts of acrylic acid ethyl ester and 1.15 parts of acrylonitrile and an aqueous solution of 0.075 part of sodium persulfate and 0.042 part of ammonium bicarbonate are pressed in. The end of the reaction is indicated by a decline of the pressure in the reaction vessel. The dispersion is coagulated by the addition of a solution of 1.5 parts of sodium chloride in 10 parts of water. The coagulated product is washed on a ribbed cylinder to remove the emulsifier. It has properties similar to the properties of the copolymer prepared in Example I.

EXAMPLE III

The polymerization is carried out as in Example II. The acrylonitrile-acrylic acid ethyl ester mixture contains, however, in addition 0.15 part of 1,3-butadiene. The polymer is worked up as in Example II.

The following mixtures of the copolymer are vulcanized for 60 minutes at a temperature of 147° C.

*Table*

|  | Mixture I, parts | Mixture II, parts |
| --- | --- | --- |
| Copolymer of Example III | 100 | 100 |
| Stearic Acid | 5 | 5 |
| Zinc Oxide | 5 | 5 |
| Sulfur | 3 | 3 |
| Tetramethylthiuramdisulfide | 2 | 2 |
| Mercaptobenzthiazole | 1 | 1 |
| Gas Soot |  | 40 |

The following tables show the mechanical properties and the gasoline absorption of the vulcanized products.

|  | Tensile Strength, kg./cm.² | Modulus, kg./cm.² with an elongation of 300% | Breaking Elongation, percent | Elasticity, percent |
| --- | --- | --- | --- | --- |
| Mixture I | 138 | 96 | 360 | 12 |
| Mixture II | 197 | 275 | 200 | 11 |

|  | Shore Hardness | Gasoline Absorption, Percent After 4 Days of 1 mm. Thick Samples |
| --- | --- | --- |
| Mixture I | 57 | 0.2 |
| Mixture II | 77 | 0.4 |

EXAMPLE IV

A copolymer is prepared as in Example III. Instead of 0.15 part of 1,3-butadiene there are used, however, 0.188 part of isoprene. The resultant copolymer of vinyl methyl ether, acrylic acid ethyl ester, acrylonitrile and isoprene has properties similar to the properties of the copolymer of Example III.

EXAMPLE V 2.93 parts of vinyl methyl ether, 4.04 parts of acrylic acid ethyl ether and 0.53 part of acrylonitrile are copolymerized as in Example II. The resultant copolymer may be mixed with silicate fillers and this mixture processed to different articles.

EXAMPLE VI

The same amounts of vinyl methyl ether, acrylic acid ethyl ester and acrylonitrile as in Example V are copolymerized with 0.13 part of 1,3-butadiene. The resultant gasoline-resistant copolymer is vulcanizable.

EXAMPLE VII 1.53 parts of vinyl methyl ether, 4.41 parts of acrylic acid ethyl ether and 1.56 parts of acrylonitrile are copolymerized as in Example II. The resultant copolymer has properties similar to those of the copolymer of Example II.

EXAMPLE VIII

A solution of 0.27 part of alkyl ($C_{14}$–$C_{18}$) sodium sulfonate, 0.09 part of potassium persulfate and 0.18 part of sodium polyacrylate in 9 parts of water are introduced in an enameled pressure vessel provided with a stirrer. The air is replaced by nitrogen in that vessel and 1.8 parts of vinyl methyl ether are pressed in. The vessel is now heated to a temperature of 70° C. and within 2 hours a mixture of 4.5 parts of acrylic acid butyl ester and 2.7 parts of acrylonitrile are pressed in. The resultant polymer dispersion is coagulated by the addition of a solution of 1.2 parts of sodium chloride in 10 parts of water. The coagulate is washed. The copolymer has a K-value according to Fikentscher, Cellulosechemie 13 (1932), 58, of 73 and absorbs less than 1% of gasoline.

EXAMPLE IX

The polymerization is carried out as in Example II. The acrylonitrile-acrylic acid ethyl ester mixture however contains 0.17 part of 2-chlor-1,3-butadiene. The polymer is further processed as in Example III. The vulcanized products have similar mechanical properties to those obtained in accordance with Example III.

The invention is hereby claimed as follows:

1. A gasoline-resistant elastic copolymer of from 3 to 40% of acrylonitrile, 10 to 52% of vinyl methyl ether and 87 to 8% of an acrylic acid ester of a saturated aliphatic monohydric alcohol containing from 2–4 carbon atoms in its molecule, said percentages being by weight and the sum of said percentages totalling 100%.

2. A gasoline-resistant elastic copolymer of from 3 to 40% of acrylonitrile, 9 to 47% of vinyl methyl ether, 1 to 5% of a diolefinic compound selected from the class consisting of 1,3-butadiene, isoprene and 2-chloro-1,3-butadiene and from 87 to 8% of an acrylic acid ester of a saturated aliphatic monohydric alcohol containing from 2 to 4 carbon atoms in its molecule, said percentages being by weight and the sum of said percentages totalling 100%.

3. A gasoline-resistant elastic copolymer of from 3 to 40% of acrylonitrile, 9 to 47% of vinyl methyl ether, from 1 to 5% of 1,3-butadiene and from 87 to 8% of acrylic acid ethyl ester, said percentages being by weight and the sum of said percentages totalling 100%.

4. A gasoline-resistant elastic copolymer of from 3 to 40% of acrylonitrile, 9 to 47% of vinyl methyl ether, from 1 to 5% of isoprene and from 87 to 8% of acrylic acid ethyl ester, said percentages being by weight and the sum of said percentages totalling 100%.

5. A method of manufacturing a gasoline-resistant elastic copolymer which comprises copolymerizing at a pH between 7 and 9 in the presence of a radical-forming catalyst a mixture of from 3 to 40% of acrylonitrile, 10 to 52% of vinyl methyl ether and 87 to 8% of an acrylic acid ester of a saturated aliphatic monohydric alcohol containing from 2 to 4 carbon atoms in its molecule, said percentages being by weight and the sum of said percentages totalling 100%.

6. A method of manufacturing a gasoline-resistant elastic copolymer which comprises copolymerizing in aqueous emulsion at a pH between 7 and 9 in the presence of a radical-forming catalyst at a temperature between 20 and 100° C. a mixture of from 3 to 40% of acrylonitrile, 10 to 52% of vinyl methyl ether and 87 to 8% of an acrylic acid ester of a saturated aliphatic monohydric alcohol containing from 2 to 4 carbon atoms in its molecule, said percentages being by weight and the sum of said percentages totalling 100%.

7. A method of manufacturing a gasoline-resistant elastic copolymer which comprises copolymerizing in aqueous emulsion at a pH between 7 and 9 in the presence of a radical-forming catalyst at a temperature between 20 and 100° C. a mixture of from 3 to 40% of acrylonitrile, 10 to 52% of vinyl methyl ether and 87 to 8% of acrylic acid ethyl ester, said percentages being by weight and the sum of said percentages totalling 100%.

8. A method of manufacturing a gasoline-resistant elastic copolymer which comprises copolymerizing at a pH between 7 and 9 in the presence of a radical-forming catalyst a mixture of from 3 to 40% of acrylonitrile, 9 to 47% of vinyl methyl ether, 1 to 5% of a diolefinic compound and from 87 to 8% of an acrylic acid ester of a saturated aliphatic monohydric alcohol containing from 2 to 4 carbon atoms in its molecule, said percentages being by weight and the sum of said percentages totalling 100%.

9. A method of manufacturing a gasoline-resistant elastic copolymer which comprises copolymerizing in aqueous emulsion at a pH between 7 and 9 in the presence of a radical-forming catalyst at a temperature between 20 and 100° C. a mixture of from 3 to 40% of acrylonitrile, 9 to 47% of vinyl methyl ether, 1 to 5% of 1,3-butadiene and from 87 to 8% of an acrylic acid ester of a saturated aliphatic monohydric alcohol containing from 2 to 4 carbon atoms in its molecule, said percentages being by weight and the sum of said percentages totalling 100%.

10. A method of manufacturing a gasoline-resistant elastic copolymer which comprises copolymerizing in aqueous emulsion at a pH between 7 and 9 in the presence of a radical-forming catalyst at a temperature between 20 and 100° C. a mixture of from 3 to 40% of acrylonitrile, 9 to 47% of vinyl methyl ether, 1 to 5% of isoprene and from 87 to 8% of an acrylic acid ester of a saturated aliphatic monohydric alcohol containing from 2 to 4 carbon atoms in its molecule, said percentages being by weight and the sum of said percentages totalling 100%.

References Cited in the file of this patent

UNITED STATES PATENTS

| | | |
|---|---|---|
| 2,384,570 | Semon | Sept. 11, 1945 |
| 2,384,574 | Stewart et al. | Sept. 11, 1945 |
| 2,436,204 | D'Alelio | Feb. 17, 1948 |

FOREIGN PATENTS

| | | |
|---|---|---|
| 745,424 | Germany | Mar. 31, 1944 |